UNITED STATES PATENT OFFICE.

ALLEN S. ASHCRAFT, OF BRANDENBURG, KENTUCKY.

HARNESS-OIL.

SPECIFICATION forming part of Letters Patent No. 383,511, dated May 29, 1888.

Application filed August 13, 1887. Serial No. 246,860. (No specimens.)

*To all whom it may concern:*

Be it known that I, ALLEN S. ASHCRAFT, a citizen of the United States, residing at Brandenburg, in the county of Meade and State of Kentucky, have invented certain new and useful Improvements in Harness-Oils; and I do declare the following to be a full, clear, and exact description of the invention, such as will enable others skilled in the art to which it appertains to make and use the same.

The special object of the invention is to make a harness-oil which will not only soften, render flexible, and preserve the leather, but be so constituted that mules, colts, calves, and rats or other vermin will not chew or disturb it.

In order to form a harness-oil which will accomplish all the purposes that I have in view, and which will readily be absorbed by leather, I employ the following ingredients and proportions: To make one gallon of harness-oil, or thereabout, I take of strained lard-oil, one quart; castor-oil, one quart; fish-oil, one quart; Eldorado oil, one pint; pulverized bark of the root of the *Sambucus nigra*, one ounce; pulverized bark of the root of the *Melia azedarach*, one ounce; indigo, two ounces; copperas, one ounce. These are shaken and mixed well together before applying the mixture, while the harness should be well washed and cleaned before the harness-oil is applied.

I have found by many trials and careful experiments that this oil is readily taken up by the leather, gives it a handsome glossy appearance, makes it flexible, waterproofs it to the exclusion of all moisture, and does not dry out or evaporate for a long time. I also discover that no animal will gnaw, chew, or willingly bite upon it.

Having thus described all that is necessary to a full understanding of my invention, what I claim as new, and desire to protect by Letters Patent, is—

A harness-oil composed of lard, fish, castor, and Eldorado oils, the pulverized barks of the roots of the elder and Paradise trees, indigo, and copperas, in about the proportions set forth.

In testimony whereof I affix my signature in presence of two witnesses.

ALLEN S. ASHCRAFT.

Witnesses:
J. M. RICHARDSON,
CHAPEZE MATHEW.